(12) United States Patent
MacNeish et al.

(10) Patent No.: US 11,458,683 B2
(45) Date of Patent: Oct. 4, 2022

(54) APPARATUS, SYSTEM AND METHOD OF OPERATING AN ADDITIVE MANUFACTURING NOZZLE

(71) Applicant: Jabil Inc., St. Petersburg, FL (US)

(72) Inventors: William MacNeish, St. Petersburg, FL (US); Erik Gjovik, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

(21) Appl. No.: 16/736,551

(22) Filed: Jan. 7, 2020

(65) Prior Publication Data

US 2020/0215755 A1 Jul. 9, 2020

Related U.S. Application Data

(62) Division of application No. 15/723,503, filed on Oct. 3, 2017.

(51) Int. Cl.
| | | |
|---|---|---|
| *B29C 64/295* | (2017.01) | |
| *B29C 64/209* | (2017.01) | |
| *B29C 64/106* | (2017.01) | |
| *H05B 6/36* | (2006.01) | |
| *B29C 64/40* | (2017.01) | |

(Continued)

(52) U.S. Cl.
CPC .......... *B29C 64/295* (2017.08); *B29C 64/106* (2017.08); *B29C 64/118* (2017.08); *B29C 64/209* (2017.08); *B29C 64/40* (2017.08); *H05B 3/12* (2013.01); *H05B 3/28* (2013.01); *H05B 3/46* (2013.01); *H05B 6/36* (2013.01); *B33Y 30/00* (2014.12); *H05B 2203/007* (2013.01); *H05B 2203/014* (2013.01); *H05B 2203/021* (2013.01); *H05B 2203/037* (2013.01); *H05B 2206/022* (2013.01); *H05B 2206/024* (2013.01)

(58) Field of Classification Search
CPC ....................................................... B33Y 30/00
USPC ....................................................... 264/308
See application file for complete search history.

(56) References Cited

U.S. PATENT DOCUMENTS

| | | |
|---|---|---|
| 6,685,866 B2 | 2/2004 | Swanson et al. |
| 7,896,209 B2 | 3/2011 | Batchelder et al. |
| | (Continued) | |

FOREIGN PATENT DOCUMENTS

| | | |
|---|---|---|
| CN | 104669623 B | 6/2015 |
| CN | 105235222 A | 1/2016 |
| | (Continued) | |

OTHER PUBLICATIONS

International Search Report and Written Opinion, dated Apr. 11, 2019 for PCT/US2018/054240.

*Primary Examiner* — Jeffrey M Wollschlager
*Assistant Examiner* — Xue H Liu
(74) *Attorney, Agent, or Firm* — Thomas J. McWilliams; Barnes & Thornburg LLP

(57) ABSTRACT

Apparatuses, systems and methods of providing heat to enable an FDM additive manufacturing nozzle having refined print control and enhanced printing speed. The heating element may include at least one sheath sized to fittedly engage around an outer circumference of the FDM printer nozzle; at least one wire coil at least partially contacting an inner diameter of the sheath; and at least one energy receiver associated with the at least one wire coil.

4 Claims, 9 Drawing Sheets

(51) Int. Cl.
*H05B 3/12* (2006.01)
*B29C 64/118* (2017.01)
*H05B 3/28* (2006.01)
*H05B 3/46* (2006.01)
*B33Y 30/00* (2015.01)

(56) References Cited

U.S. PATENT DOCUMENTS

| | | |
|---|---|---|
| 9,327,447 B2 | 5/2016 | Batchelder et al. |
| 9,345,070 B2 † | 5/2016 | Long |
| 10,073,424 B2 | 9/2018 | Lin et al. |
| 10,086,564 B2 | 10/2018 | Batchelder et al. |
| 10,131,131 B2 | 11/2018 | Batchelder et al. |
| 10,137,679 B2 | 11/2018 | Brennan |
| 10,201,931 B2 | 2/2019 | Batchelder et al. |
| 10,286,606 B2 | 5/2019 | Duro Royo et al. |
| 2004/0104515 A1 | 6/2004 | Swanson et al. |
| 2005/0129941 A1 | 6/2005 | Comb et al. |
| 2012/0018924 A1 | 1/2012 | Swanson et al. |
| 2012/0070523 A1 † | 3/2012 | Swanson |
| 2012/0258190 A1 | 10/2012 | Batchelder et al. |
| 2014/0331744 A1 * | 11/2014 | Van Egmond ......... G01N 30/16 73/23.41 |
| 2015/0086668 A1 | 3/2015 | Perez et al. |
| 2015/0097308 A1 | 4/2015 | Batchelder et al. |
| 2015/0321418 A1 | 11/2015 | Sterman et al. |
| 2016/0214175 A1 | 7/2016 | Nordstrom |
| 2016/0332377 A1 | 11/2016 | Lee et al. |
| 2017/0100888 A1 | 4/2017 | Batchelder |
| 2017/0151704 A1 | 6/2017 | Go et al. |
| 2017/0274454 A1 | 9/2017 | Feng |
| 2018/0056608 A1 | 3/2018 | Dunn et al. |
| 2018/0207869 A1 | 7/2018 | Lee et al. |
| 2019/0001574 A1 | 1/2019 | Yackabonis et al. |
| 2019/0217546 A1 | 7/2019 | Bosveld et al. |
| 2019/0232566 A1 | 8/2019 | Bosveld |
| 2019/0240969 A1 | 8/2019 | Schuller et al. |

FOREIGN PATENT DOCUMENTS

| | | | |
|---|---|---|---|
| CN | 105666877 B | 6/2016 | |
| CN | 205439280 U | 8/2016 | |
| CN | 106671409 A | 5/2017 | |
| CN | 206415609 | 8/2017 | |
| CN | 206446128 U | 8/2017 | |
| CN | 107415226 A | 12/2017 | |
| CN | 107471626 A | 12/2017 | |
| CN | 108311698 A | 7/2018 | |
| CN | 207579114 U | 7/2018 | |
| CN | 110039765 B | 4/2019 | |
| EP | 2483060 | 4/2011 | |
| EP | 20160099125 A | 8/2016 | |
| EP | 3052299 B1 | 1/2018 | |
| EP | 3281771 | 2/2018 | |
| EP | 3326789 A1 * | 5/2018 | ............ B22D 46/00 |
| EP | 3342582 A1 | 7/2018 | |
| KR | 1020170011951 A | 2/2017 | |
| KR | 20170062965 A | 6/2017 | |
| WO | 201550958 A3 | 4/2015 | |
| WO | 2015189661 A1 | 12/2015 | |
| WO | WO-2016102669 A1 * | 6/2016 | ............... H05B 6/44 |
| WO | 2018038751 A1 | 3/2018 | |
| WO | 2018170213 A1 | 9/2018 | |
| WO | 2019005040 A1 | 1/2019 | |
| WO | 2019141892 A1 | 7/2019 | |
| WO | 20190183240 A1 | 9/2019 | |

\* cited by examiner
† cited by third party

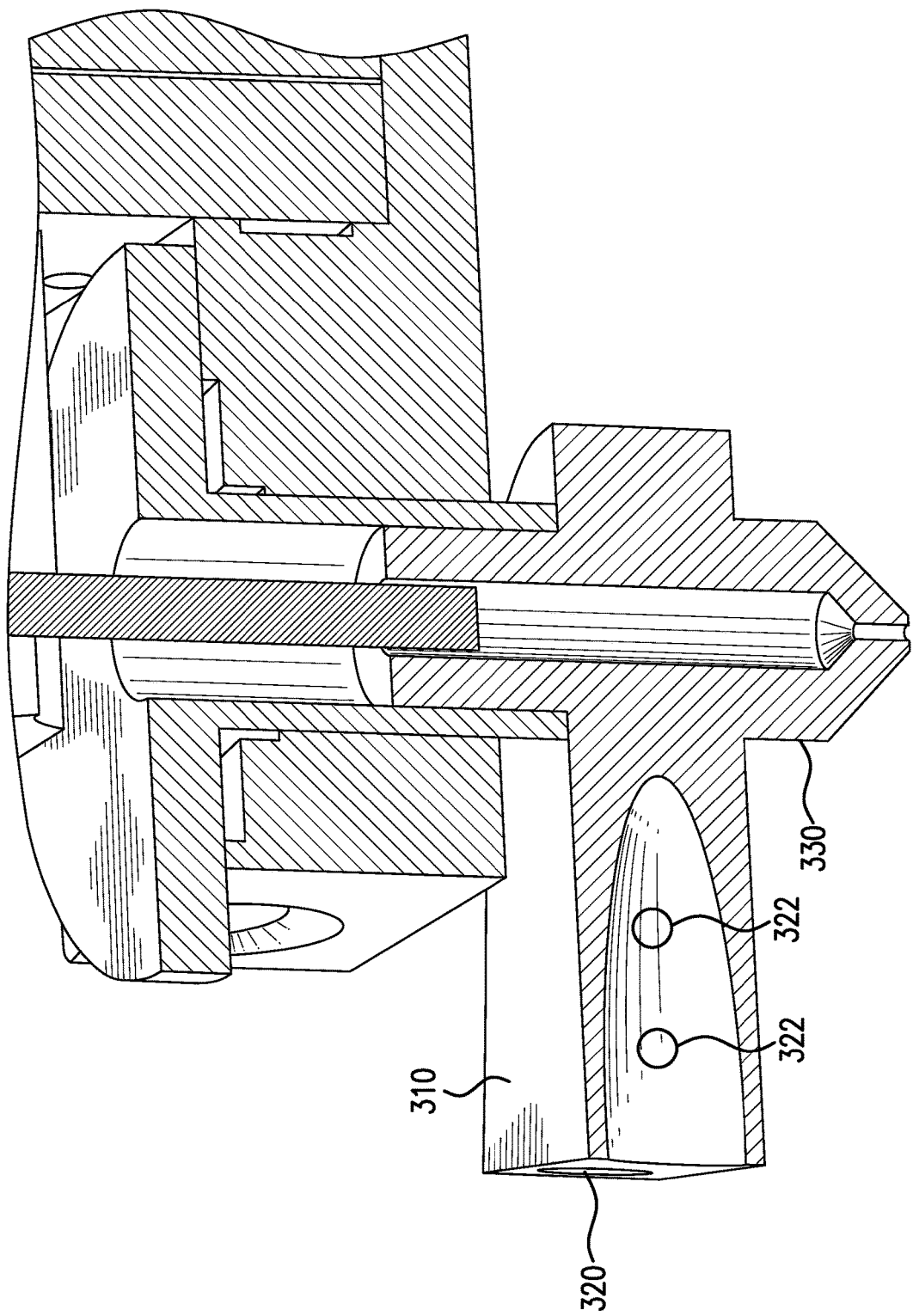

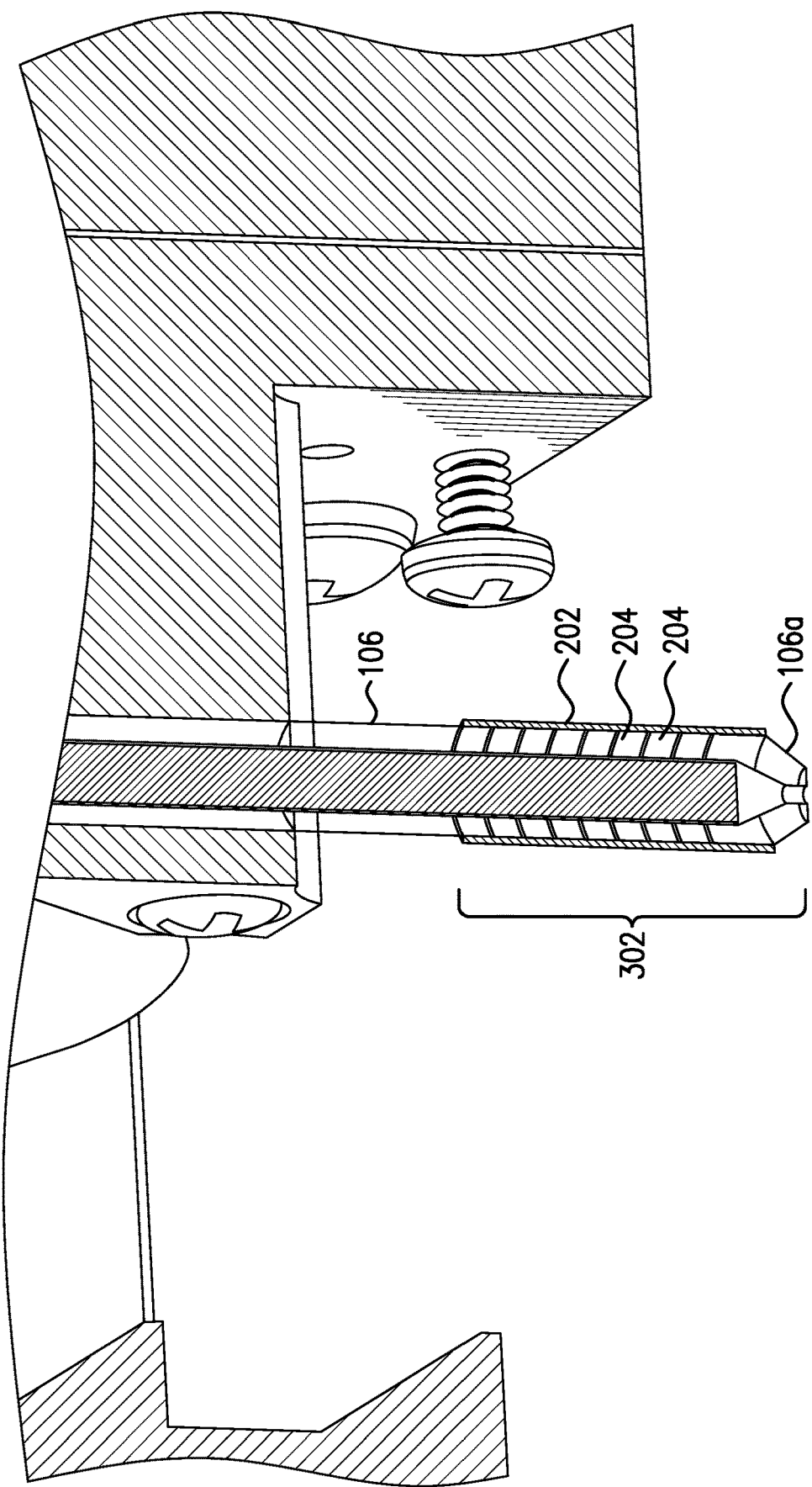

APPARATUS, SYSTEM AND METHOD OF OPERATING AN ADDITIVE MANUFACTURING NOZZLE

CROSS REFERENCE TO RELATED APPLICATION

The present application is a divisional application of U.S. Non-Provisional application Ser. No. 15/723,503, filed Oct. 3, 2017, entitled: APPARATUS, SYSTEM AND METHOD OF OPERATING AN ADDITIVE MANUFACTURING NOZZLE, the entirety of which are incorporated here by reference.

BACKGROUND

Field of the Disclosure

The present disclosure relates to additive manufacturing, and, more specifically, to an apparatus, system and method of operating a fused deposition of material (FDM) nozzle for additive manufacturing.

Description of the Background

Additive manufacturing, including three dimensional (3D) printing, has constituted a very significant advance in the development of not only printing technologies, but also of product research and development capabilities, prototyping capabilities, and experimental capabilities, by way of example. Of available additive manufacturing (collectively "3D printing") technologies, fused deposition of material ("FDM") printing is one of the most significant types of 3D printing that has been developed.

FDM is an additive manufacturing technology that allows for the creation of 3D elements on a layer-by-layer basis, starting with the base, or bottom, layer of a printed element and printing to the top, or last, layer by heating and extruding thermoplastic filaments into the successive layers. To achieve these results, an FDM system includes at least a print head from which the thermoplastic print filament is fed to a FDM printer nozzle, an X-Y planar control form moving the print head in the X-Y plane, and a print platform upon which the base is printed and which moves in the Z-axis as successive layers are printed.

The FDM printer nozzle heats the thermoplastic print filament received from the print head to a semi-liquid state, and deposits the semi-liquid thermoplastic in variably sized beads along the X-Y planar extrusion path plan provided for the building of each successive layer of the element. The printed bead/trace size may vary based on the part, or aspect of the part, that is being printed. Further, if structural support for an aspect of a part is needed, the trace printed by the FDM printer may include removable material to act as a sort of scaffolding to support the aspect of the part for which support is needed. Accordingly, FDM may be used to build simple or complex geometries for experimental or functional parts, such as for use in prototyping, low volume production, manufacturing aids, and the like in a fraction of the time it would take to manufacture such object using conventional methods.

However, the use of FDM in broader applications, such as medium to high volume production, is severely limited due to a number of factors affecting FDM, and in particular affecting the printing speed, quality, and efficiency for the FDM process. As referenced, in FDM printing it is typical that a thermoplastic filament is heated to a molten state and then squeezed outwardly from the FDM printing nozzle onto either a print plate/platform or a previous layer of the part being produced. The FDM printer nozzle is moved about by the robotic X-Y planar adjustment of the print head in accordance with a pre-entered geometry, such as may be entered into a processor to control FDM printing head movements to form the part desired.

Because of the advances in robotics and high available processing speed, the "choke point" for the FDM printing process is generally the FDM printer nozzle itself. In particular, control over the speed of heating and cooling of the FDM printer nozzle, and in particular refinements in the control and start/stop timing of printing provided by advanced control of heating and cooling of the nozzle, would allow for significant improvements in the printing provided by FDM technologies, but are not presently contemplated in the known art. Accordingly, the ability to provide refined control and sensing of various aspects associated with FDM printing, such as heating and cooling of the print material, pressure on and liquid state of the print material, and the like, would allow for refinement of and improvement to the FDM process.

Notwithstanding the foregoing, currently available nozzles, for the most part, are metallic, and thus conductive, in nature, and have associated therewith a large heating block (such as may include a thermocouple for heating of the nozzle associated therewith) with a significant thermal mass. Thus, because of the large thermal mass of the heating block, refined control of heating and cooling of the nozzle is currently limited due to the permeation of heat to undesired aspects of the metallic nozzle. In addition, current nozzle designs make it difficult to focus heat to areas of the nozzle because of the typically conductive nature of the nozzle, and the slowness of heating and cooling of the nozzle caused by the large thermal mass of the heating block associated with the nozzle from which the control for the heating (and cooling) is provided.

Accordingly, current nozzle designs suffer from significant issues which impede the ability to improve the FDM printing process. A principal one of these impediments is the inability to provide refined control of heating and cooling on the printing nozzle or on particular aspects thereof. Lack of heating and cooling control may cause, for example, inconsistent melting of the thermoplastic material which may lead to low print speeds and nozzle clogging. Lack of cooling control may cause blobs, nipples or mis-printing to occur due to inability to quickly and accurately control the temperature of the nozzle.

Therefore, the need exists for an apparatus, system, and method for providing an FDM additive manufacturing nozzle having refined print control and enhanced printing speed.

SUMMARY

The disclosed exemplary apparatuses, systems and methods provide at least heat delivery to enable an FDM printer nozzle for additive manufacturing having refined print control and enhanced printing speed. A heating delivery element may include at least one sheath sized to fittedly engage around an outer circumference of the FDM printer nozzle; at least one wire coil at least partially contacting an inner diameter of the sheath; and at least one energy receiver associated with the at least one wire coil to increase the efficiency of the FDM printer nozzle.

The disclosed exemplary apparatuses, systems and methods may additionally include the at least one wire coil comprising a nichrome wire. Further, the at least one wire coil may comprise at least two wire coils. The at least two wire coils may be at least partially staggered along a longitudinal axis of the FDM printing nozzle. The at least two wire coils may be respectively embedded in at least two sheaths. The at least two sheaths may be concentrically about one another.

Thus, the disclosed embodiments provide an apparatus, system, and method for providing an FDM printer nozzle for additive manufacturing having refined temperature control, print control and enhanced printing speed.

BRIEF DESCRIPTION OF THE DRAWINGS

The disclosed non-limiting embodiments are discussed in relation to the drawings appended hereto and forming part hereof, wherein like numerals indicate like elements, and in which:

FIG. 4A illustrates a prior art FDM printer nozzle and associated heating block;

FIG. 4B illustrates an exemplary resistive hot end printer nozzle;

DETAILED DESCRIPTION

Figure 1:
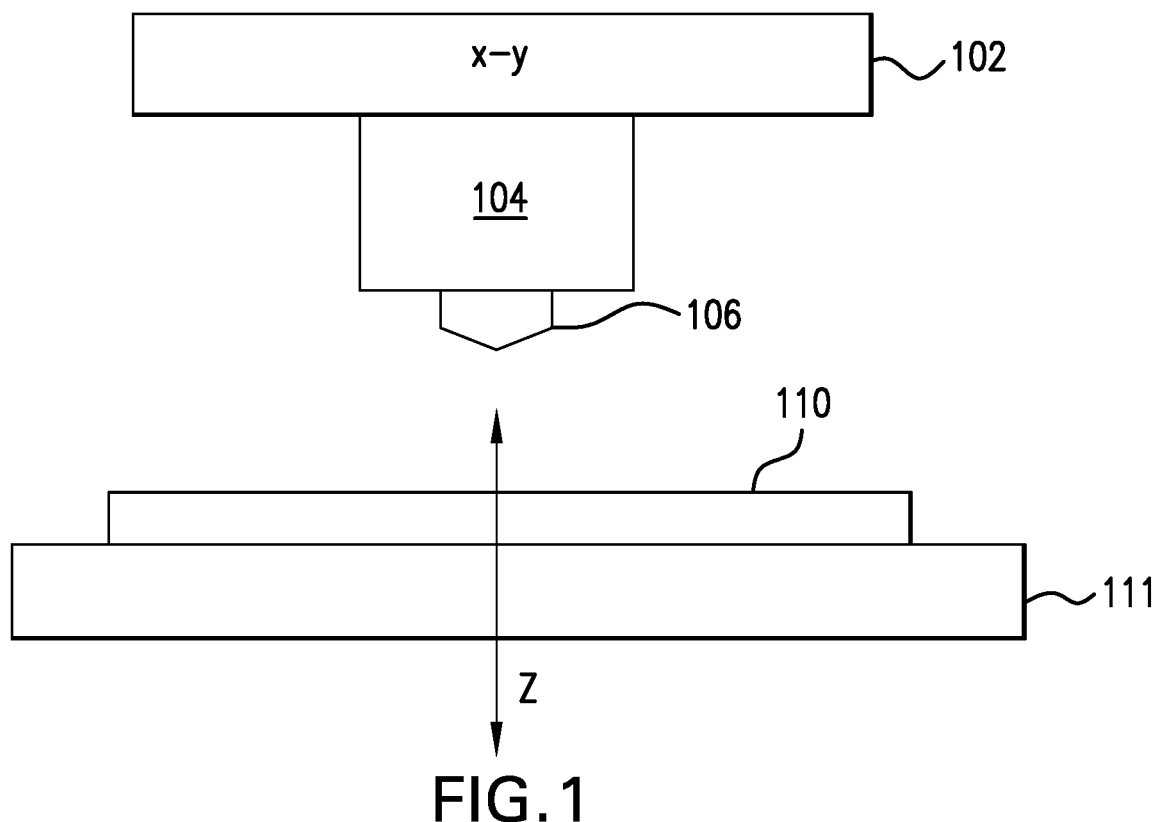
FIG. 1 is an exemplary FDM print system.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Aspects of the embodiments may provide real time localization, control and targeting of nozzle heating, such as FDM nozzle heating, such as to create improved print control to allow for higher print speed and greater print accuracy. These and other distinct advantages may be provided in accordance with the provided improvements over the known art, such advantages including lower nozzle costs and print costs; provision of the print nozzle as a consumable/disposable good; suitability for nozzle production using known semi-conductor and foundry technologies; enhanced design freedom for internal and external nozzle features; and extremely fine control of hot and cold zones for both the nozzle and the printed material.

The disclosed improved printing apparatus, system, and method may be applied to any type of 3D printing, such as FDM printing that uses thermoplastics, polymers, metals, ceramics, food, and wax printing, by way of non-limiting examples as the print material. More particularly, additive manufacturing can occur via any of various known methods, including the aforementioned FDM printing. By way of example, sintering of powders may be performed in order to additively build layers. Further, for example, resin-based additive printing may be performed.

With regard particularly to FDM printing, current methods are generally fairly slow and inefficient for additive manufacturing, and are presently limited in the number of materials that may be printed. This is in large measure due to the inadequacies of known devices, systems and methods for heating the printer nozzle in FDM systems. Heating elements for additive manufacturing in the disclosed embodiments and equivalents thereto may rectify these inadequacies of known FDM systems. The disclosed heating elements may include, by way of non-limiting example, resistive heating elements, an inductive heating element (such as around the nozzle proximate to the orifice of the nozzle), an IR/radiative element, a RF coupled element, and so on.

More particularly, although the disclosed exemplary embodiments may heat and push material for "3D," such as FDM, printing as is known in the art, they also provide refined heating and refined pushing of that material, such as through improved localization of heating. Heating of the print material in an FDM process is the single most important factor in refining FDM printing, and while fast printing is desirable to enhance available FDM printing processes, faster printing speeds require increased heating, and increased heating leads to less refined control over the heating area for known nozzles, such as the presently available metal nozzles that are used in conjunction with large heating blocks. These known heating blocks and nozzles, in combination, also present extreme difficulties in providing the expedient cooling necessary to stop printing, particularly in highly heat-conductive metal nozzles, which expedient cooling is necessary for refined heating control to allow for high-speed FDM printing.

In short, the high speed, high quality FDM printing provided in certain of the embodiments requires the transfer of as much controllable energy to the print material as is possible, at the greatest mass flow rate, to thereby allow for the desired increased printing speeds. Accordingly, the refined heating systems and methodologies disclosed herein improve print speed and control in FDM printers. For example, the embodiments may provide at least inductive or resistive coil heating, such may be provided by a coil wrapped about the nozzle using wet winding and/or semiconductor fabrication processes, and such as may be wrapped on a dielectric, metal, ceramic, or glass nozzle, and/or on a substrate layer applied to nozzle, by way of non-limiting example.

That is, aspects of the disclosed embodiments may be employed on a nonconductive or a conductive, such as a metal, nozzle. For example, dielectric layer(s), such as glass, may be deposited, such as via vacuum deposition, CVD, PVD, or sputtering, onto a metal nozzle, thereby providing an intermediate dielectric substrate onto which conductive layers and/or coils may be placed.

The disclosed systems and methods may, in addition to the foregoing advantages of refined heating, provide other heretofore unknown advantages. For example, the disclosed embodiments and equivalents thereto may help to prevent nozzle clogging. More specifically, one of the main dynamics that promotes clogging in the known art is that a traditional nozzle must be run at a significant temperature-rise over the melting point of the thermoplastic. Once the print material flow is stopped, the print material and the (over)heated nozzle then come to equilibrium, which causes the print material to approach the nozzle temperature in the current art. This degrades the print material, making it brittle and thereby causing clogging. In certain of the disclosed embodiments, the providing of 'slow' and 'fast,' such as zoned, heating allows for the use of the 'slow' mode to maintain the nozzle inner temperature below the degradation temperature of the print material, and use of the 'fast' mode may be used only at flow condition. Thus, when the print material flow stops in the disclosed embodiments, the 'fast' mode may be turned off quickly, thus preventing a temperature rise above degradation temperature.

FIG. 1 is a block diagram illustrating an exemplary FDM printer 100. In the illustration, the FDM printer 100 includes an X-Y axis driver 102 suitable to move the print head 104, and thus the print nozzle 106, in a two dimensional plane, i.e., along the X and Y axes. Further included in the FDM printer 100 for additive manufacturing are the aforementioned print head 104 and print nozzle 106. As is evident from FIG. 1, printing may occur upon the flow of heated print material outwardly from the nozzle 106 along a Z axis with respect to the X-Y planar movement of the X-Y driver 102. Thereby, layers of printed material 110 may be provided from the nozzle 106 onto a build plate 111 along a path dictated by the X-Y driver 102.

Figure 2:
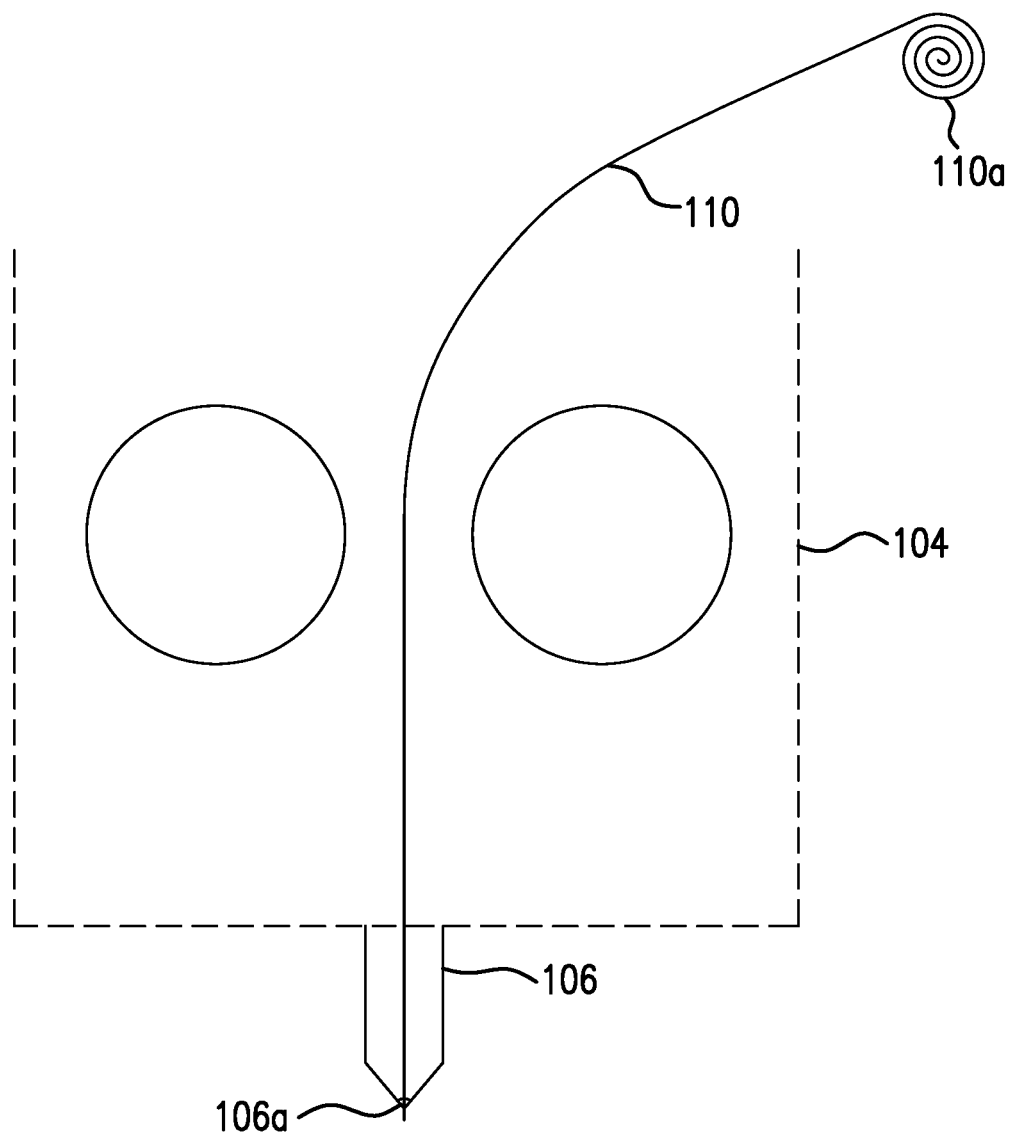
FIG. 2 is an exemplary FDM print system.

FIG. 2 illustrates with greater particularity a print head 104 and nozzle 106 system for an additive manufacturing device, such as a FDM printer. As illustrated, the print material 110 is extruded via the print head 104 from a spool of print material 110a into and through the nozzle 106. As the nozzle 106 heats the print material 110, the print material 110 is at least partially liquefied for output from an end port 106a of the nozzle 106 at a point distal from the print head 104. Thereby, the extruded print material 110 is "printed" outwardly from the port 106a via the Z axis along a X-Y planar path determined by the X-Y driver 102 (see FIG. 1) connectively associated with the print head 104.

Figure 3:
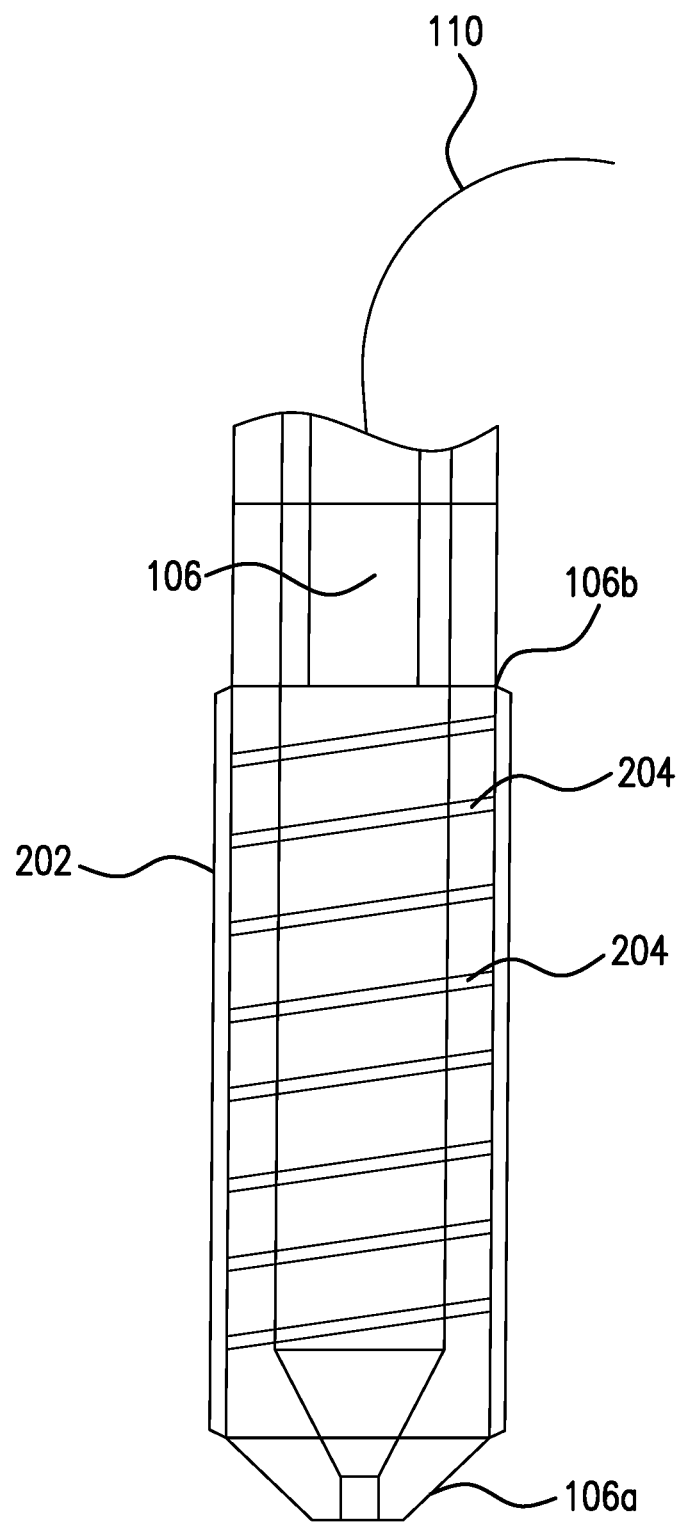
FIG. 3 is an exemplary resistive nozzle hot end.

FIG. 3 illustrates an exemplary nozzle 106. The nozzle 106 may be, for example, constituted of steel, ceramic, glass, or of any other suitable material to achieve the desired thermal properties. For example, a glass nozzle may reduce local thermal capacity. For example, $C_p*rho*V$ for glass=$0.75*2.2*0.05=0.0825$ J/C, but for steel, the same calculation yields $0.46*7.8*0.05=0.1794$ J/C, which represents more than twice the joules needed, for heating or cooling, for a steel nozzle per degree Celsius as is needed by the glass nozzle.

For heating of the nozzle 106, the nozzle 106 may be wrapped in one or more wire windings 204. The nozzle 106 may additionally include one or more sheaths 202 about nozzle 106. The nozzle 106 may also include an additional layer or multiple layers between the wire winding 204 and the nozzle 106 outer diameter, and/or between the sheath 202 (where present) and the windings 204, such as in order to enhance thermal coupling, redistribute heat, insulate from overheating, or the like.

The sheath 202 may about the nozzle 106 as referenced, and may be over, underneath, or have embedded therein wire windings 204. The sheath 202 may be press fit, plasma vapor deposited or plated, rolled foil, or the like in its application to the shank of the nozzle 106. In the illustration of FIG. 3 and by way of non-limiting example, the sheath 202 encompasses the one or more coils 204.

By way of non-limiting example, the nozzle 106 may comprise a shank 106b and port tip 106a, comprised of steel, having at least partially thereabout the one or more wire windings 204, such as nichrome wire windings wrapped thereabout, wherein the windings 204 may be at least partially enclosed within sheath 202. The wire winding 204 may serve as a heating coil to heat the print material 110 within the inner diameter of the nozzle 106. Of note, the delivery of heat by the heating coil 204 may change the resistance of the heating coil 204. Accordingly, the resistance change in the heating coil 204 maybe sensed in order to assess the level of heating being delivered to the nozzle 106. Further, the sheath 202 may be employed to refocus the heat from coil 204 back into nozzle 106.

The coil 204 and/or multiple coil aspects or coils, and the proximity of those coils 204 to the nozzle 106 such as in conjunction with the small thermal mass of sheath 202, may allow for highly refined and targeted control of heat delivered to the print material printed through the nozzle 106. This may allow for expedited heating and cooling, such as near-immediate heat up and cool down/shut off, which provides the pushing of much more significant an amount of print material 110 through the nozzle port 106a than can be pushed in the known art.

More specifically, the speed and amount of print material 110 exiting the hot end of the nozzle 106 at port 106a may be determined by a variety of factors. Such factors may include, by way of non-limiting example, the material printed, the extrusion rate, the rate of motion of the X-Y driver, and the heat applied to the extrusion material. The latter factor, i.e., the heat applied to the extrusion material, may be selectively employed in certain of the embodiments, such as using windings 204, in order to obtain substantially optimal and efficient printing in light of others of the aforementioned print factors.

FIGS. 4A and 4B illustrate the comparison of a prior art nozzle (shown in FIG. 4A) to an exemplary resistive hot end 302 according to the embodiments, such as may be comprised of the nozzle 106, windings 204, and/or sheath 202 as shown in FIG. 4B. More particularly, the comparison of FIG. 4 is illustrative of the differences, such as the significant difference in thermal mass, between the prior art heating block 310 of FIG. 4A, and the combination of the sheath 202 and windings 204 of the hot end 302 of FIG. 4B.

As shown in FIG. 4A, the current art includes a large heating block 310 which integrates a heating cartridge 320 and a thermocouple 322, each of which are plugged into the heating block 320. Upon actuation of thermocouple 322, the heating block 320 begins to heat, and passes the heat through the heating block 310 to the so-called "hot end" of the nozzle, which in turn heats the print material 110 within that portion of the nozzle 330 receiving the delivered heat just above the distal tip of the nozzle 330. As shown, the nozzle 330 threads into or otherwise connectively integrates with the heating block 310.

In sum, the foregoing forms a "hot end" having a significant thermal mass in the known art. This thermal mass corresponds to a characteristic thermal momentum, which carries with it a particular heating and cooling ramp rate. Because of this ramp rate, the heating block of the known art can neither be turned on nor off quickly and efficiently, thereby causing bumps and nipples in the printed material path, as well as nozzle bleeding and clogging.

In stark contrast to the known art and as illustrated in FIG. 4B, the thermal mass of the disclosed embodiments for hot end 302 is significantly reduced over the thermal mass provided by the known art. Accordingly, the disclosed embodiments of the hot end 302 heat more expediently than the known art, and cool more expediently than the known art. That is, the minimal thermal capacity provided by certain of the disclosed embodiments of the hot end 302 provides a lower temperature capacity than the known art, and consequently is appreciably more responsive to application of or removal of energy to the hot end 302.

In certain of the embodiments and in order to optimize the foregoing lower temperature capacity over the known art, the winding or windings 204 may vary by type, length, and/or actuation timing and manner in accordance with the location of the windings 204 along the geometry of the hot end 302. For example, high density windings may be put at the nozzle taper approaching the port 106a in order to provide maximum heat and maximum heating control at the exit port 106a for the print material.

Additionally, although the example illustrated in FIG. 4B may include a heating block, such as in the form of sheath 202, which may include a thermocouple, the skilled artisan will appreciate that such a heating block may or may not be present with the heating methodologies provided throughout, by way of non-limiting example. That is, windings 204 may reside directly on nozzle 106, such as being wet wound thereon, may have one or more layers between windings 204 and nozzle 106. In addition, the windings 204 may or may not be surrounded by sheath 202.

The embodiment illustrated in FIG. 4B and other like embodiments may thus allow for faster ramping of heat application to the extruded print material, and may allow for shutoff of extrusion of the print material at a notably faster rate, than in the known art. This is due, in part, to the refined control provided by the wire winding 204 about the nozzle, and the improved thermal coupling thus provided between the heat available from the wire winding 204 and the print material 110 within the nozzle 106. It should be noted that thermal mass concerns may also be addressed by control software, and, in an exemplary embodiment, a servo drive, such as a 2.5 kHz servo drive, that at least partially provides energy to the wire winding 204.

Figure 5:
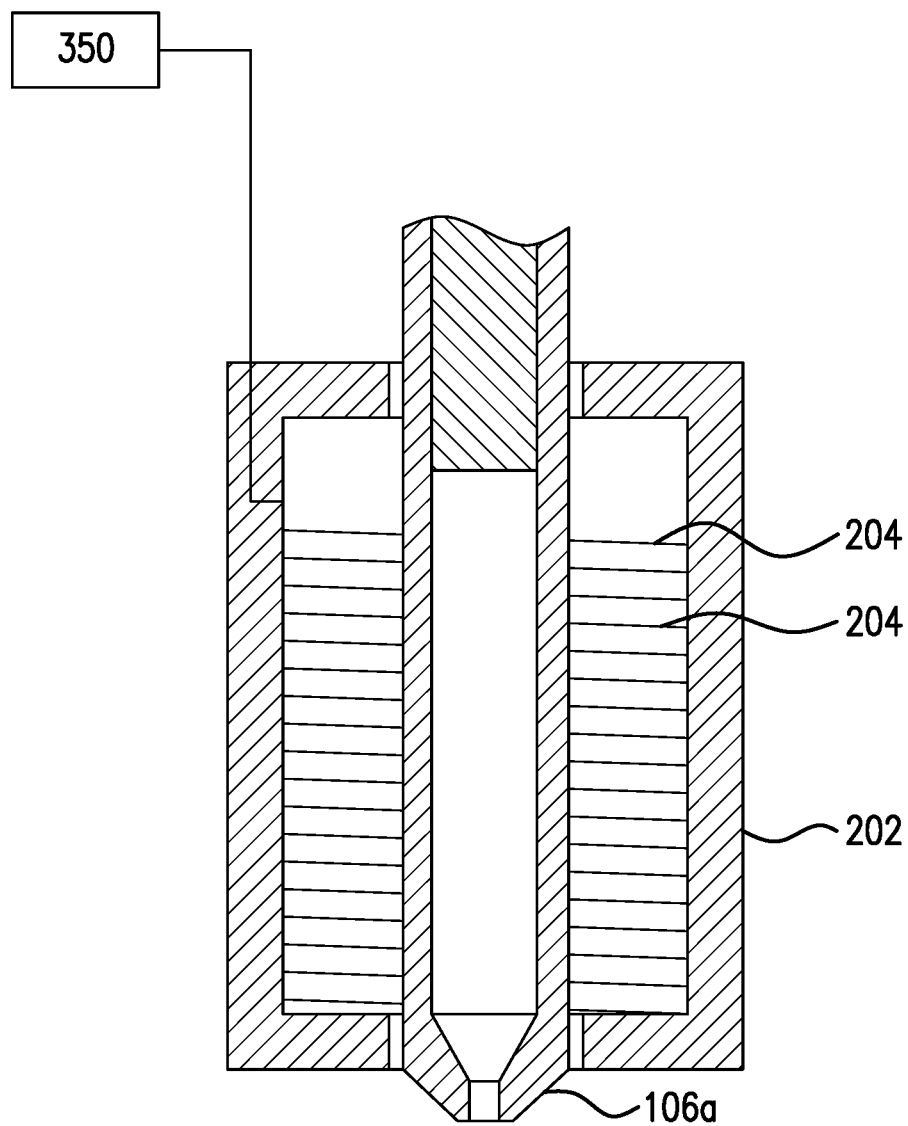
FIG. 5 illustrates an exemplary delivery of power to a resistive hot end printer nozzle.

Different power formats may be employed to provide heating energy to the wire winding 204 in certain of the embodiments. For example, as illustrated in FIG. 5, certain power sources 350 may be matched with particularity to certain types of wire windings 204, certain types of nozzles 106, and so on. By way of example, Newtonian heating, i.e., providing current to the wire winding to generate heat, may be performed in conjunction with any of various types of nozzles and/or with various types of wire windings 204, such as the wire windings 204 embedded in sheath 202 of FIG. 5. Other energy types 350 may be employed to provide thermal excitation to the wire windings 204, such as irradiation, radio frequency excitation, ultrasonics, microwaves, or any other power provision techniques understood to the skilled artisan. Moreover and as referenced above, certain types of power sources 350 may be specifically matched to certain types of wire windings 204 and nozzles 106, such as wherein infrared excitation may be employed with a glass nozzle for improved thermal coupling and ramp time, or such as wherein the wire winding comprises a bulk element rather than individual windings.

Figure 6:
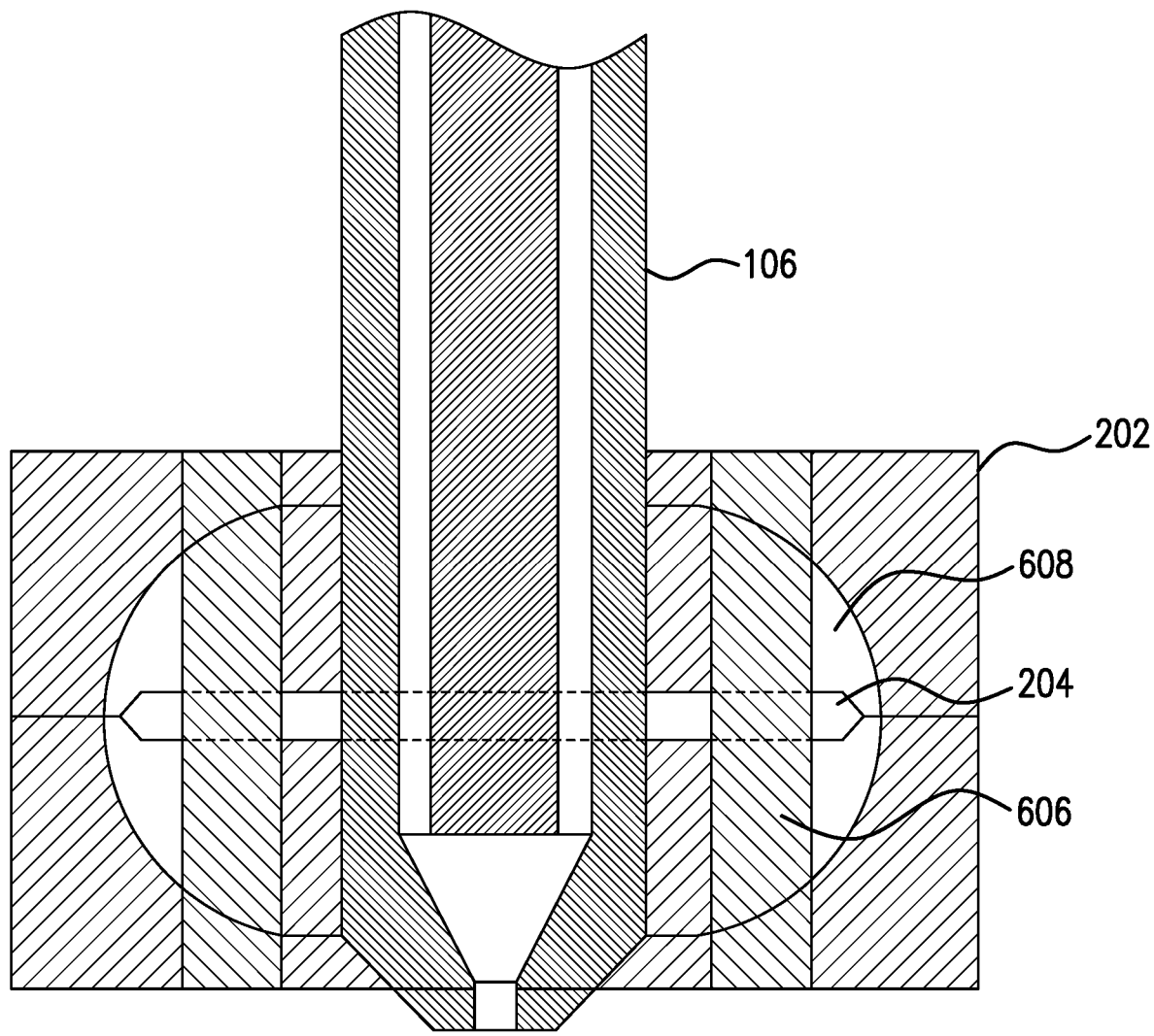
FIG. 6 illustrates an exemplary FDM hot end printer nozzle.

In additional alternative and exemplary embodiments, such as that illustrated in FIG. 6, a distinct wire winding may not be provided as wire winding 204, but rather distinct characteristics may be provided around or embedded in nozzle 106 to serve effectively as windings 204, as that term is used herein. By way of example, the sheath 202 may be provided about the nozzle 106 to provide thermal coupling to a particular heating source, such as to receive microwave energy for heating. That is, the sheath 202 may be embedded or otherwise formed with characteristic materials that are thermally excited by bombardment using microwaves, which will thereby allow the sheath 202 to impart heat directly to the nozzle 106.

Of course, the wire windings or like heating elements 204, rather than being wound onto or otherwise directly applied to nozzle 106, may reside within sheath 202 separate and apart from nozzle 106. The providing of the sheath 202 as a secondary physical element from nozzle 106 but as a primary thermal coupling thereto allows for fitting of the thermal coupling element onto a nozzle 106 after creation of the nozzle 106, i.e., sheath 202 having therein windings 204 or the equivalent thereof may be provided as a "bolt on," post-manufacture component to the nozzle 106.

By way of non-limiting example, the windings 204 may take the form of bulk element 204, as shown in FIG. 6. This bulk element may be subject to structure 606 that is also embedded within sheath 202, such as to maintain the bulk element 204 at a given distance from nozzle 106 so as to maintain a certain level of heating. Moreover, sheath 202 may include, for example, an embedded reflective cavity 608, such as to redirect heat from element 204 back toward nozzle 106 for optimized heating.

Figure 7:
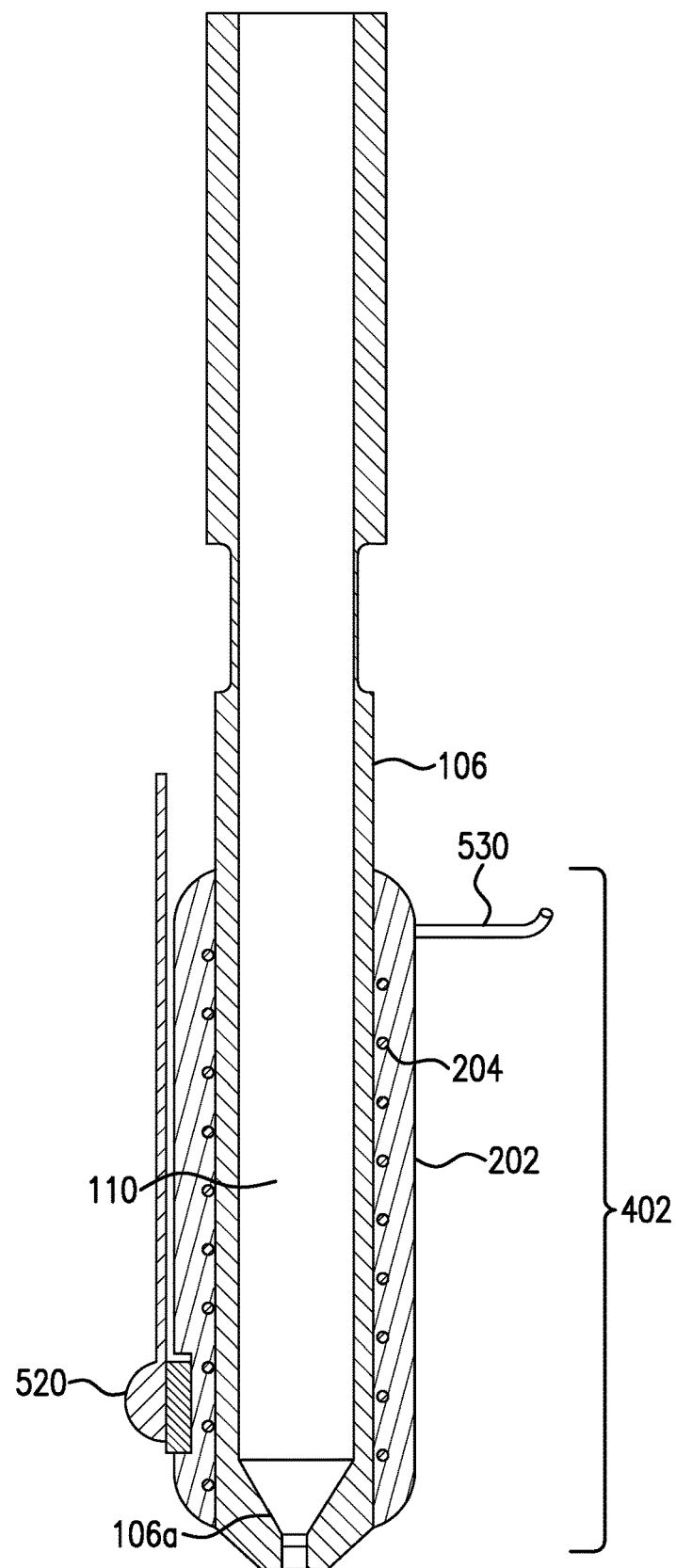
FIG. 7 illustrates an exemplary hot end printer nozzle with an embedded sensor.

FIG. 7 illustrates with particularity an exemplary nozzle 106 having a thermal coupling element 402. In the illustration, the thermal coupling element 402 is included in a sheath 202, and also includes, embedded therein, a resistive wire wrapping 204. As such, an electric current may be "plugged into" sheath 202 to resistively and thermally excite the sheath 202, thereby causing element 402 to heat the print material 110 within the nozzle 106 at locations adjacent to the element 402.

More particularly, the windings 204, or the equivalent thereof for receiving energy and thermally coupling to deliver heat to the nozzle 106, may thus be provided on the nozzle 106, in a ring/sheath around the nozzle 106, or at both positions, by way of non-limiting example, such as to provide convection, conduction, and/or radiative heating focused on the nozzle 106 and the printing material 110 therein. By way of example, wire winding 204 may be of nichrome resistance wire as mentioned above, and may use ceramic (silicate) adhesive. Moreover and as referenced herein, various insulators, such as glass fabric, may be included on-board the nozzle as a shield from the winding 204 or sheath 202, or as a shield between the winding 204 and the sheath 202, or between the winding 204 or sheath 202 and the external environment. Such insulators may also include reflectors, by way of non-limiting example, and may thus be used on the inner diameter of the sheath 202 to redirect heat back toward nozzle 106. By way of particular example, an exterior surface or surfaces, either integrated on-nozzle or as a separate sheath, may be highly-reflective such that, for IR power is produced at the nozzle 106, that IR power that would otherwise be lost is redirected back into the nozzle 106 by the insulating layer.

By way of further example, a direct-wind onto the nozzle 106 of a coil 204, such as of nichrome wire, may be solidified with the aforementioned silicate adhesive, whether or not further structurally supported by placement of a surrounding sheath 202. Moreover, multiple layers may be wound onto the nozzle to form windings 204, and may be separated by a thin layer of glass fabric, which may also provide additional strength and stability. Yet further, matrix material around the heating elements 204, whether or not heating elements 204 are embedded in a sheath 202, such as the silicate adhesive above, may be colored, such as with black, to increase emissivity, thereby increasing IR emission power. Of note, although a fast heating method, IR generally has little heating capacity, and hence may be best used to provide modulation of flow unless enhanced in the manners discussed herein, i.e., using increased emissivity and/or physical separation from the nozzle inner diameter to allow maximum IR power delivery.

In embodiments, the length of the sheath 202 may be varied, as may be the relative length of the nozzle 106. Variations in nozzle length may accommodate different elements 402, such as to allow for different elements 402 to serve different purposes, such to allow for the most efficient heating of particular print materials. By way of non-limiting example, a nozzle 106 in the embodiments may be longer than in the known art, and may include a particular taper at the nozzle tip 106a, such as to enhance the heating properties of heating elements 402 that may be employed, particularly such as to improve the temperature gradient provided by the element 402 to the nozzle 106 to correspondingly enhance the maximum feed rate of the particular print material 110 in the nozzle 106.

As was mentioned above in relation to measuring heat delivered based on resistance (or other electrical characteristic) change in winding 204, the characteristics of element 402, such as the resistance or conductance thereof, may be readily sensed in order to assess the heat being delivered to nozzle 106. More particularly, element 402 and/or sheath 202 may be provided with sensors 520 that are embedded in or otherwise associated with sheath 202. The data related to changes in, for example, the resistance or conductance of sheath 202 may then be directly or indirectly indicative of the temperature of the element 402 at the measured point or points, thereby allowing for very precise temperature sensing and control at the nozzle tip 106a.

More particularly, a sensor 520 may be embedded in or on, or otherwise physically associated with, a sheath 202 placed around a print nozzle 106. The sheath 202 may include therewithin a heating coil 204. Thus, the sensor 520 may receive, directly or indirectly, a heat reading of the heat delivered by the heating coil 204 to nozzle 106. In addition to sensor 520 as shown, the sensor may comprise embedded traces or other inter- or intra-connective elements, as will be understood to the skilled artisan.

In additional and alternative embodiments, a thermocouple (not shown) may also be included in the sheath 202 provided around the nozzle 106, as may be one or more expedited cooling mechanisms. For example, FIG. 7 illustrates, by way of non-limiting example, a cooling tube 530, wherein a small amount of air (or another gas) forced into the tube 530 or being vented from the tube 530 may increase or decrease the rate of which heat delivered to the nozzle 106. The cooling tube 530 may include one or more valves (not shown) to allow for limitations on air or other gases released or received. Moreover, other cooling methodologies may be employed using the tube 530. By way of example, inlet and outlet tubes maybe provided to enable a closed looped cooling system, such as wherein cooling liquid or gas, such as water or air, may be circulated into one tube and out of the other.

Experientially, a 4-up 0.065 mm nichrome wire winding with L~=70 mm gives ~21.6 ohms and an 0.3 ohm swing over a 250 C swing in 3 mm PLA inside of a 7 mmOD/3 mmID glass tube, with a resistance per temperature gain of 0.00115 ohms/C. Higher gain may be achieved by increasing the nominal coil resistance, although that also requires higher voltage. Accordingly, in the embodiments, temperature may be discerned based on amperage—that is, temperature measurement of the coil may be tracked based on coil resistance. Of course, on-board thermocouples, RTDs, or other contact-sensing technologies, and/or optical sensing technologies, to assess heating may be employed as sensor(s) 520 in embodiments.

Figure 8:
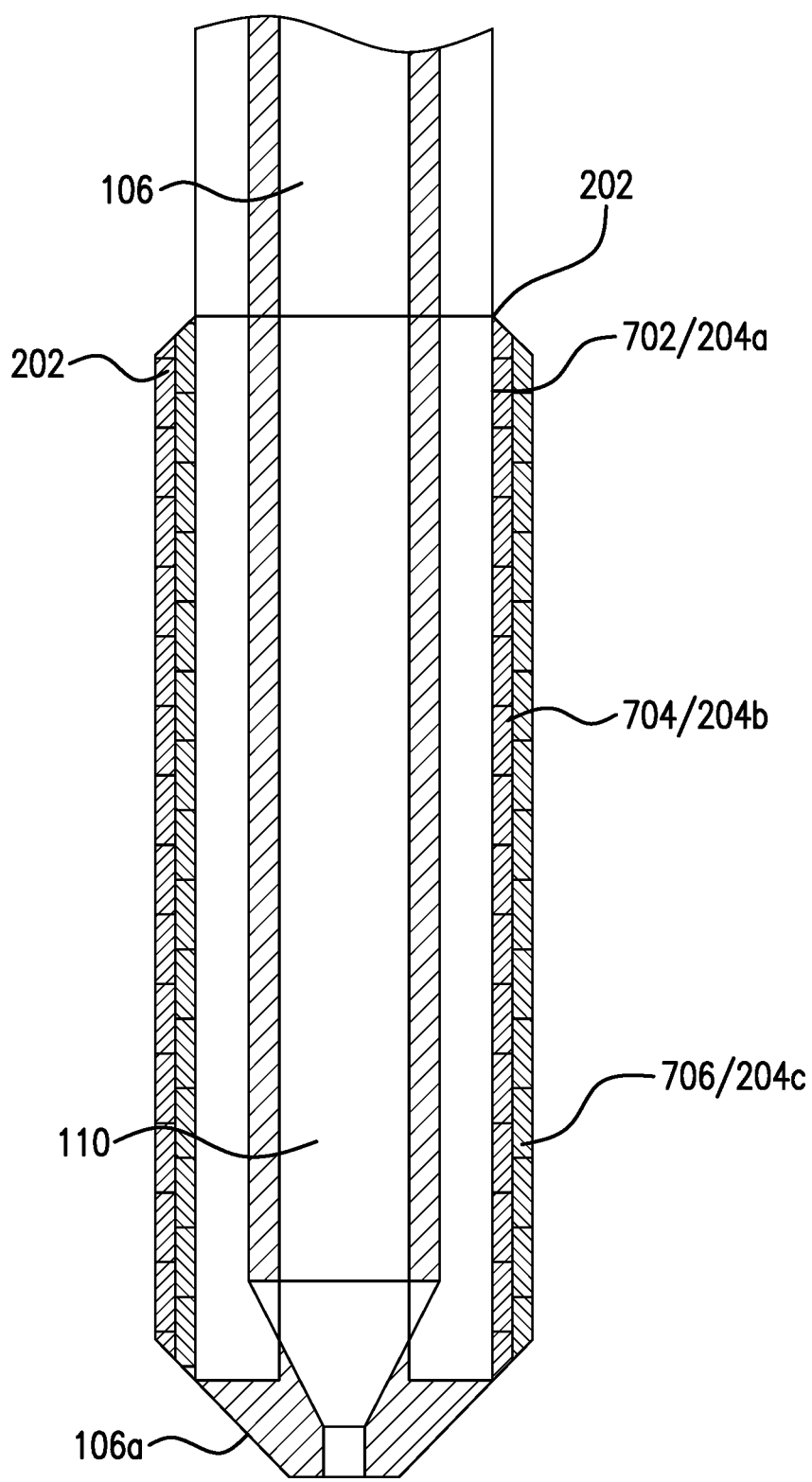
FIG. 8 illustrates an exemplary hot end printer nozzle with staggered heating zones.

FIG. 8 illustrates that nozzle 106 heating may be provided in one or several "zones" or "phases". For example, provided may be a first heating zone 702 for heating the length of the print material melt 110 within nozzle 106; a second heating zone 704 for "high speed" melts, such as may necessitate added power for taller melts; and a third heating zone 706 specifically for the nozzle tip 106*a*, at which point the highest power density is needed for the melt exiting port 106*a* into the pattern. Moreover, the zones 702, 704, 706 may be provided by providing overlapping windings 204*a*, 204*b*, 204*c*, and/or by providing one or more concentric or staggered sheaths 202*a*, 202*b*, 202*c* that each include discrete windings. Alternatively, one or more staggered or concentric sheaths may be provided over multiple overlapped zone windings, i.e., the layers may comprise winding 1, winding 2, then sheath 1; or may be concentrically provided successively over each winding, i.e., the layers may comprise winding 1, sheath 1, winding 2, sheath 2, etc.

In short, multiple zones of coils with differing power densities allows for the presentation of different levels of power to different areas of the melt. Of note, the multiple resistors of the multiple coil zones may share one common leg, thus reducing the number of wires coming off the heater.

As discussed throughout, for optimal control and power expenditure impact, it may be desirable to use direct resistive heating (and cooling) as close as is practicable to the print material within the nozzle. Accordingly, the heating element may be a winding, a sheet material or bulk material (collectively "winding" throughout, unless otherwise indicated) highly adjacent to the print material within the nozzle.

The heating elements discussed throughout may be included as separate heating elements, or as part of a sheath 202 to be fitted over the nozzle 106. In such instances, the heat provided may be conductive (i.e., Newtonian), convective, or radiative (i.e., Planck/Stefan-Bolzmann). Additionally, a thermocouple to provide the requisite heating energy may be wet-wound with the coil structure, by way of non-limiting example. Further, the sheath(s) may be replaced in such embodiments without need to replace the nozzle 106.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A heating element for a 3D printer nozzle, comprising:
   at least one sheath comprising a first inner diameter and a first outer diameter, the at least one sheath sized to engage around an outer circumference of the 3D printer nozzle;
   at least one nichrome wire coil at least partially contacting the first inner diameter of the at least one sheath and embedded fully between the first inner diameter and the first outer diameter; and
   at least one energy receiver associated with the at least one nichrome wire coil, the at least one nichrome wire coil having a variable coil density and consequent variable power density about the outer circumference of the 3D printing nozzle, and wherein the at least one sheath slides at least substantially over the at least one nichrome wire coil.

2. The heating element of claim 1, further comprising at least one insulating layer between the outer circumference of the 3D printer nozzle and the at least one wire coil.

3. The heating element of claim 1, wherein the at least one sheath comprises one of a press fit, a plasma vapor deposit, a plating, and a rolled foil.

4. The heating element of claim 1, further comprising at least one resistance sensor embedded in the at least one sheath which is capable of sensing a resistance change in the at least one wire coil as indicative of a level of heating delivered to the 3D printer nozzle.

* * * * *